Aug. 24, 1937.  H. ROSENBERG  2,090,641
ART OF PRODUCING CAPPED NUT BLANKS
Filed May 21, 1935  9 Sheets-Sheet 1

Inventor:
Heyman Rosenberg
By Edgar M. Kitchin
His Attorney.

Aug. 24, 1937.   H. ROSENBERG   2,090,641
ART OF PRODUCING CAPPED NUT BLANKS
Filed May 21, 1935   9 Sheets-Sheet 3

Inventor:
Heyman Rosenberg,
By Edgar M Kitchin,
his Attorney.

Aug. 24, 1937.  H. ROSENBERG  2,090,641
ART OF PRODUCING CAPPED NUT BLANKS
Filed May 21, 1935  9 Sheets-Sheet 6

Inventor:
Heyman Rosenberg
By Edgar M Kitchin
His Attorney.

Aug. 24, 1937.   H. ROSENBERG   2,090,641
ART OF PRODUCING CAPPED NUT BLANKS
Filed May 21, 1935   9 Sheets-Sheet 9

Inventor:
Heyman Rosenberg,
By Edgar M Kitchin,
His Attorney.

Patented Aug. 24, 1937

2,090,641

UNITED STATES PATENT OFFICE 2,090,641

ART OF PRODUCING CAPPED NUT BLANKS

Heyman Rosenberg, New York, N. Y.

Application May 21, 1935, Serial No. 22,593

11 Claims. (Cl. 10—86)

It has heretofore been proposed to form capped nut blanks from globular pieces of material and from sheet material, but certain difficulties have presented themselves in each instance, such as lack of sufficient stability of the angles of the tool-receiving portion of the nut when made of sheet material, and the necessity for drilling out the material of the blank to provide the tap-receiving recess when made from a solid piece of material.

An object of the present invention is to overcome both of these and other objections.

Heretofore proposed methods for forming forged capped nuts have involved the use of a stamping machine which requires the constant attention of an operator, and, if more than one machine is operated, an operator for each machine. The operation of a stamping machine is, as is well known, comparatively slow and accordingly proportionally expensive; whereas according to the present invention I produce capped nuts from pieces of material, whether sheet metal or lumps or slugs of material, and without regard to whether they are globular or otherwise shaped, and produce them by the employment of standard headers equipped with improvements hereinafter set forth, which headers function much more rapidly than stamping machines and do not require the constant service and care of an operator, so that as many as twelve headers may be properly cared for by a single operator.

Furthermore, the practicing of the present invention by the employment of a standard header with the improvements hereinafter set forth produces a smoother and finer product, superior in every respect to that which can be obtained by the operations of a stamping machine.

Thus, among the objects in view, is the saving of power and labor, the elimination of loss of material, the avoidance of excess operation, such as the drilling of the blank, and the obtaining of a superior product at minimum expense.

A general object is the production of capped nut blanks from any of various forms of materials by simple cold forging operations.

With these and further objects in view as will in part hereinafter become apparent and in part be stated, the invention possesses three phases, one comprising an art of forming capped nut blanks, the second comprising improved apparatus applied to and cooperating with standard headers as the best and most facile manner of carrying out the art, and the third comprising the superior, resulting product.

The present invention, so far as the art and the product are concerned, includes those steps and combinations of steps of the art effective in producing capped nuts and the product so produced whether made from a piece of sheet material or merely from a solid mass without regard to its exact contour, as, for instance, a slug severed from a rod or wire.

The combination of steps comprising the art broadly includes shaping the material into the form of an elongated thimble and then compressing the material of the thimble longitudinally while expanding portions of it laterally to the final shape of a capped nut blank. It should be understood that a capped nut is a nut having its trailing end closed, so that, when it is threaded over a bolt or other screw-threaded instrument, the end of the bolt is covered by the cap of the nut, which cap may be partiglobular or otherwise shaped, and the closed end may be considered a dome, from which fact such nuts are sometimes referred to as dome nuts.

Also, the invention includes shaping the material for a capped nut blank to a thimble-like shell and then varying portions of the walls of the shell to provide a polysided exterior condition of the nut body while preserving the internal recess, the walls of which are to be formed with the internal or nut thread.

That phase of the invention relating to apparatus for facilitating the most facile practicing of the art includes a die for receiving material for the forming of a capped nut blank, dies cooperating therewith for shaping the material into an elongated thimble or shell, and dies for compressing the thimble to a shorter length while expanding portions of its sides to produce a polysided nut body.

It should be understood that by preference, as will hereinafter become apparent, four-stroke die apparatus is employed where the invention is practiced in treating masses of material such as, for instance, pieces of sheet metal drawn to shell-like form or irregular slugs cut successively from a supply of wire or rod. The four-stroke dies may be provided by a four-stroke header, or, as is preferred, by two two-stroke headers. When the two headers are employed, the first is provided with means for severing a piece of wire or other slug or mass of material, or otherwise detaching work material from a supply source, and also provided with means for transporting such a slug or mass of material into line with cooperating dies that function first to move the work material from the transporting means into supporting engagement with one of the dies, then forging the said work material into a rough general outline of the thimble to be formed, and then shaping the work material into the contour of the elongated thimble. The thimble is then transported to the second header where it is subjected to two steps of an operation in addition to the feeding of the thimble into line with the operating dies, the first step consisting of mounting the thimble in one of the dies on means for preserving the interior recess in the thimble while the exterior contour of the thimble is being changed, and the second step consisting in the treating of the thimble so mounted for finishing the blank in the form of a shorter product than the length of the thimble but having the tool-receiving exterior surfaces or angular faces customarily in the form of a hexagon.

It should also be understood that in the course of such treatment of the work material, if at any time, incident to the cold forging operations, internal stress is set up in the material tending to interfere with or prevent the further effective shaping of the material to the required successive contours, appropriate treatment for normalization is carried out, such as annealing, and also, when the blank is completed, it may be tumbled, burnished, or otherwise treated for polishing and otherwise finishing its surfaces, and then it is ready for the tapping operation to provide the internal threads that make of it a complete nut, or the finishing of the surfaces may be carried out after the tapping operation, as may be preferred.

For convenience of disclosure, the apparatus preferably employed and the improved features thereof will be described along with a setting forth of the preferred steps and combinations of steps of the improved process.

In the accompanying drawings,—

It is, of course, well understood in the industry that a header is a machine for forging enlargements on the ends of wire or rod blanks in the course of manufacturing nails, screws, bolts, and like fasteners. One of the earlier and simpler forms of such headers is seen more or less diagrammatically in the patent to T. Ferry, No. 1,069,659, dated August 5, 1913. The header shown in the said Ferry patent is of the double-stroke type, that is to say, a forming or matrix die is located to receive material to be treated by two plunger dies, one of which is caused to approach and act upon the material with one stroke of the machine, and then shifts out of line while the other shifts into line and acts on the material during the next stroke. The headers have become somewhat more complicated and more efficient than the illustration in the patent just mentioned, but the principle generally remains the same in the two-stroke headers.

An illustration of a modern and efficient header is found in the product now being marketed by the Waterbury Farrel Foundry and Machine Company, of Waterbury, Connecticut, and the present invention is well adapted to be exemplified in the improved attachments and in the efficient practicing of a process with such a header, and especially with a header of the type popularly referred to as solid-die, double-stroke, high speed crank header. Parts of this header are disclosed in the patent to C. O. Petitjean, No. 1,478,356, dated December 18, 1923. Parts commonly known and popularly used on such headers are in part omitted and in part shown in the accompanying drawings, so much only being illustrated as is adapted for facilitating disclosure of the present invention. Detailed description of parts that are thus commonly known and are not directly modified by the present invention is omitted as not needed.

Referring to the drawings by numerals, the apparatus seen in Figures 1 to 10 inclusive consists essentially of a header having the usual pitman 1 journaled on an actuating crank and pivoted to impart the requisite thrusts to the die block 2. A plunger slide 3 is carried by the die block 2 in position to slide vertically thereon or across the rectilinear horizontal path of the die block 2 while being carried thereby and receiving its thrust therefrom. A punch holder 4 is mounted on the plunger slide 3 and carries the punches or plunger dies 5 and 6 which are spaced vertically apart. An appropriate apparatus, such as a crank 7 and its connected parts, imparts timed, vertical shifting movement to the plunger slide 3 to cause the punch or plunger die 5 first to operate and then to move up out of line and then the punch or plunger die 6 to operate.

Figure 5:
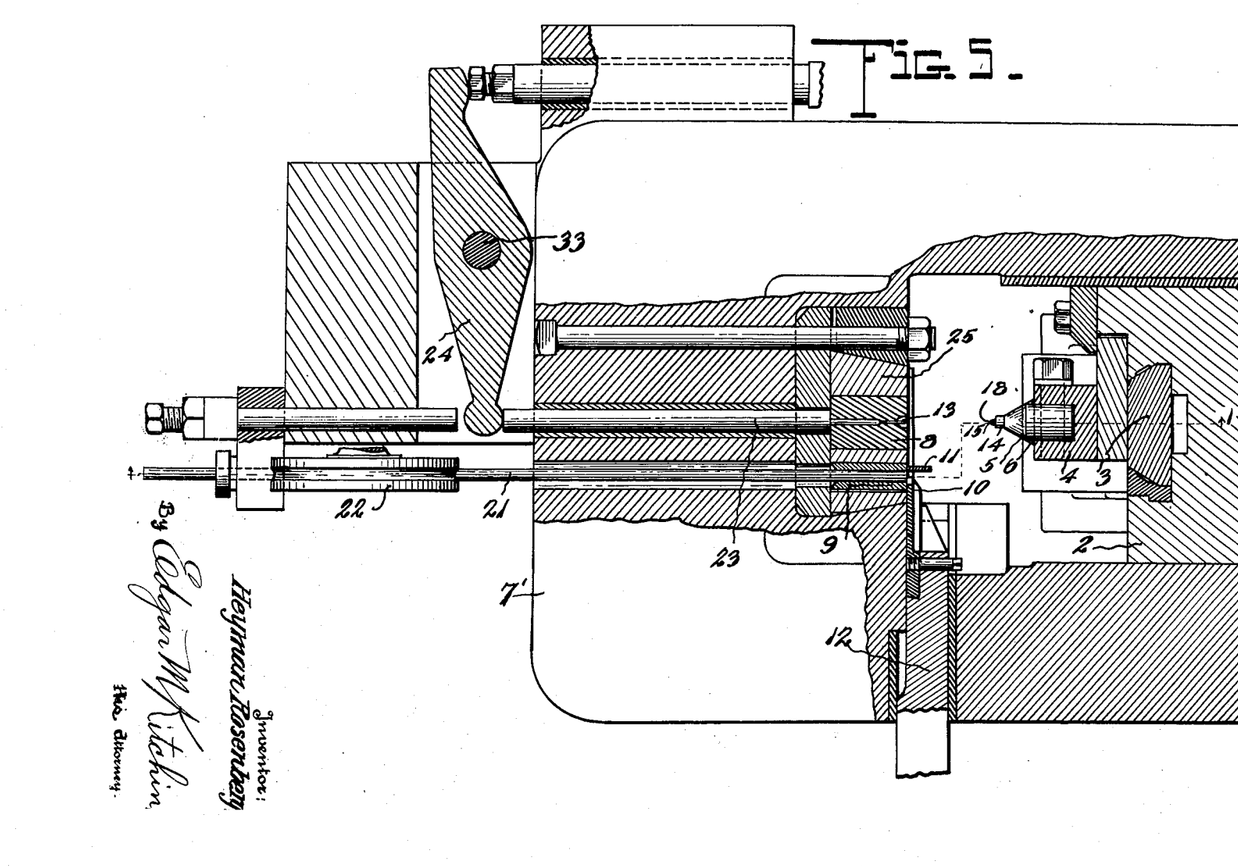
Figure 5 is a view partly in plan and partly in horizontal section of the header of Figure 1, the parts being shown on a scale somewhat enlarged relative to Figure 1.
Figure 6:
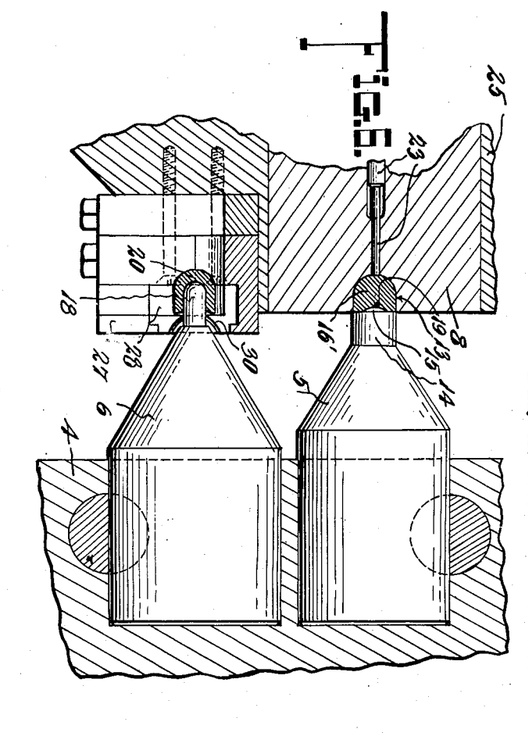
Figure 6 is a fragmentary, detailed view showing the plunger dies of Figures 1 and 5 in elevation and the matrix die and stripper in section, the parts being in the position at the conclusion of an initial stroke of the initial plunger die and the stripper engagement of the second plunger die.

Of course, the parts just described are appropriately mounted in a suitable bed or framework 7' having an internal space accommodating the plunger dies 5 and 6 spaced from the cooperating opposing matrix die 8. At one side of die 8 is a cut-off die 9 and a laterally reciprocating cutter bar 10 (corresponding to cutter 14 of said Petitjean patent) with which cooperates the spring-stressed clamping finger 11 carried by the fiddle bow (not shown but seen at 17 in said Petitjean patent, finger 11 corresponding to finger 21 of said patent) for clamping the material severed by the bar 10 against the bar while the bar is moving into line with the die 8. A reciprocating cutter slide 12 (corresponding to slide 13 of the Petitjean patent) carries the shearing bar 10. Slide 12 is reciprocated in timed relation to the action of the die block 2, and the plunger dies 5 and 6. Thus, shearing bar 10 successively severs a slug or blank from a supply of wire or rod fed through die 9, moves the slug over to alinement with matrix die 8, with the cooperation of finger 11, releases the blank or slug and returns to cut off the next blank or slug in timed relation to the movements of the other cooperating parts.

In nail making headers, the die corresponding to die 8 is the heading die and appropriately recessed punches are carried by the punchholder 4 to cooperate with the blank in the heading die. According to the present invention, however, the punches or plunger dies 5 and 6 are not the ordinary heading cone punches but are especially constructed and incorporate features of the present invention. It will be noted that the die 8 is provided centrally with a recess 13 into which the material of the blank is to be forced in giving the blank its initial and second shape. To this end, the plunger die 5 is provided with a preferably cylindrical, reduced extension or projection 14 terminating in a parti-globular or bulbous extension 15 centrally, axially located. The free end surface of the projection 14 with the exception of the bulbous part 15 is flat, and the projection 14 is of a diameter to snugly fit within and slide into the die recess 13 for effectively forging the slug or piece of work material comprising the blank 16 of Figure 2 against the inner end and sides of the recess 13 to substantially the condition seen at 16' in Figure 3 with the depression 19 in its outer end. Irregularity in the original shape of the blank 16 is not objectionable so long as the material is of such contour and quantity that it can be successfully forced into the die recess 13 and there cold forged into the form of a thimble-like shell 20, seen detached in Figures 4 and 12.

Figures 1, 2, 3, 4:
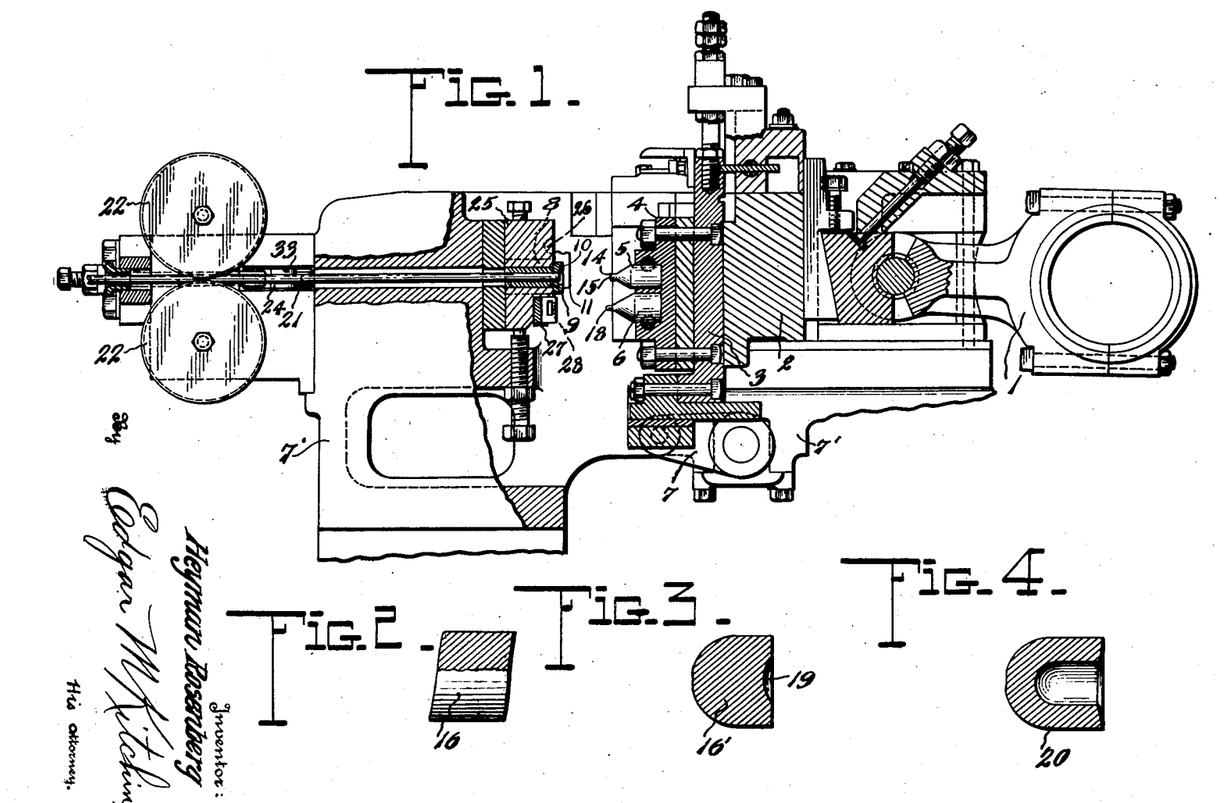
Figure 1 is a view partly in side elevation and partly in vertical section of a standard double-stroke header equipped with features of the present invention, the section being taken approximately on the planes indicated by line 1—1 of Figure 5 and looking in the direction of the arrows.
Figure 2 is a view in elevation, partly broken away of a piece of work material, such as a fragment or slug severed from wire stock for use in practicing the art comprising part of the present invention, the slug being seen on a greatly enlarged scale relative to Figure 1.
Figure 3 is a longitudinal section through such a slug as seen in Figure 2 after the first stroke of the shaping dies.
Figure 4 is a longitudinal section of the blank of Figure 3 after the second stroke of the shaping dies.

Whether the work material be a slug, as seen at 16 in Figure 2 cut from a supply of wire or rod, or a slug otherwise produced, the slug is held, as by cutter bar 10 and finger 11, in line with the die recess 13 as the die block 2 is concluding the first forward stroke, so that projection 14 with its rounded extension 15 engages the slug and forces it into recess 13 and compresses it sufficiently for cold forging it and causing it to conform substantially to the contour of the die recess 13 and to thus assume the shape 16' of Figure 3. Then the die block 2 recedes and leaves the work material 16' in the die recess 13.

Figure 7:
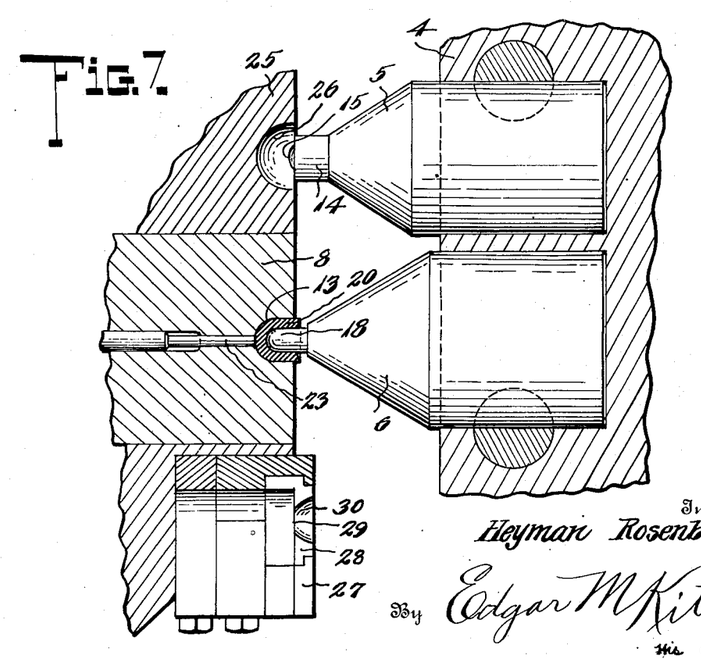
Figure 7 is a view similar to Figure 6, but showing the parts in the position at the conclusion of the forming stroke of the second plunger die.
Figures 11, 12, 13:
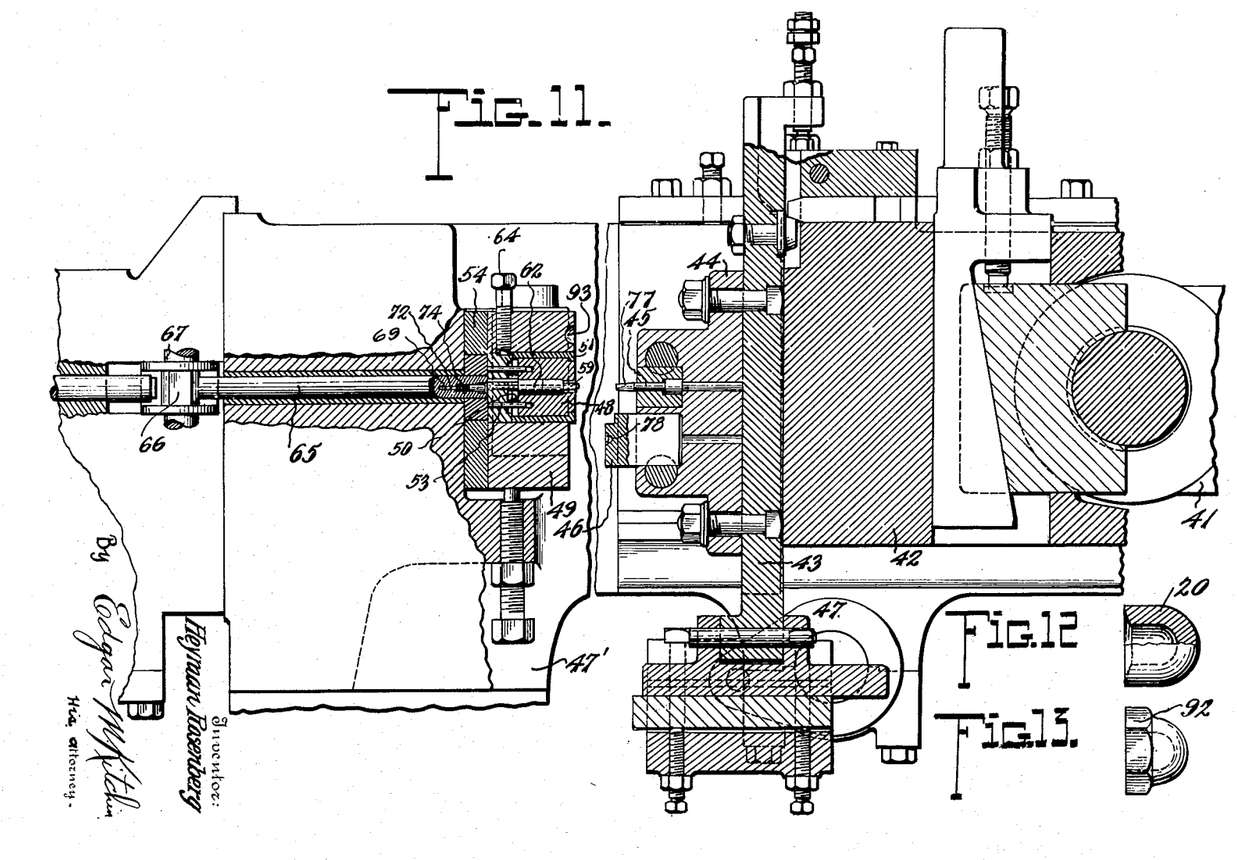
Figure 11 is a view similar to Figure 1 of a second double-stroke header equipped with further features of the present invention, the parts being seen on a somewhat enlarged scale over those shown in Figure 1.
Figure 12 is a sectional elevation of the blank seen in Figure 4 but located in the proper relative position for application to the matrix die seen in Figure 11.
Figure 13 is the completed blank after the completion of the operation of the mechanism of Figure 11, and is the final product of the present invention.

Before the next advance stroke of die block 2, the punch slide is shifted upward by the action of the crank 7 and cooperating parts until the plunger die 6 is brought into line with the die recess 13. Plunger 6 is provided with an axially outstanding shaping finger 18 which, in the forward stroke of die block 2, enters the recess 13 and enters the centering depression 19 of blank 16', and the further advancing movement of the finger 18 causes the material of blank 16' to be flowed both laterally into more compact condition, and longitudinally into greater length, moving outward along the die finger 18 to the position substantially as indicated in Figure 7, so that the work material in the die recess 13 is thus caused to assume the contour seen in Figures 4 and 12, or substantially that contour. It should be understood that the showing of the work material in Figures 2, 3, 4, 6, 7, and 12 is more or less idealized as expressing the characteristic contours given to the work material as the process progresses; but it should be further understood that slight departures from such contours, such, for instance, as some little irregularity about the outer margin or free edge of the thimble 20 as seen in Figures 4 and 12, or some slight flattening of the parti-globular or rounded inner end thereof as in Figure 3 is not of any materiality, such irregularity being effectively corrected in the next succeeding steps of the process.

It is important that the amount of material in the blank or slug, such as seen in Figure 2, be substantially that required for the completed article, and it will, of course, be understood that when the slug or fragment of wire, as seen in Figure 2, is employed, the operation begins with the cutting off of the slug from the supply wire or rod seen at 21. This supply wire or rod 21 is passed between the feeding rolls 22 which are part of the standard equipment of the header machine, and the wire or rod is extended through the cut-off die 9 where the protruding end portion is severed by the cross stroke of the shearing bar 10. The spring finger 11 resiliently stresses the portion being cut off against the shearing bar 10 and continues to frictionally hold the slug after it is severed while the bar 10 is functioning as a carriage to move the slug over into line with the recess 13. Properly timed with this movement the plunger die 5 approaches and begins to press the slug 16 into the recess 13, and thereupon bar 10 moves back and spring finger 11 releases the slug and rides over plunger 5 back to again engage the protruding end portion of wire 21. Wire 21 is of course fed through the die 9 into position for being cut off for supplying the next slug in timed relation to the other movements of the machine. It should be understood that the feeding rolls 22 and cut-off die 9 (as well as the shearing bar 10 and spring finger 11) are standard equipment of well known types of headers for use in the making of nails, screws, bolts, and the like, and that the feeder rolls 22 are provided with appropriate adjustment and control devices for feeding forward the desired and requisite quantity only of the wire or rod 21 to be severed by the shearing bar 10. Wire or rod 21 may be steel, copper or other material according to the product desired.

A knock-out pin 23 is part of the standard equipment of a header, and, in the present construction, extends through the die 8 and axially into the recess 13, said pin extending through a portion of the framing 7' in position to be engaged by the free end of an actuating lever 24, pivoted at 33 to swing in timed relation to the strokes of the die block 2 to cause the pin 23 to have a knock-out stroke at every alternate stroke of die block 2 as the die finger 18 is receding.

Figure 8:
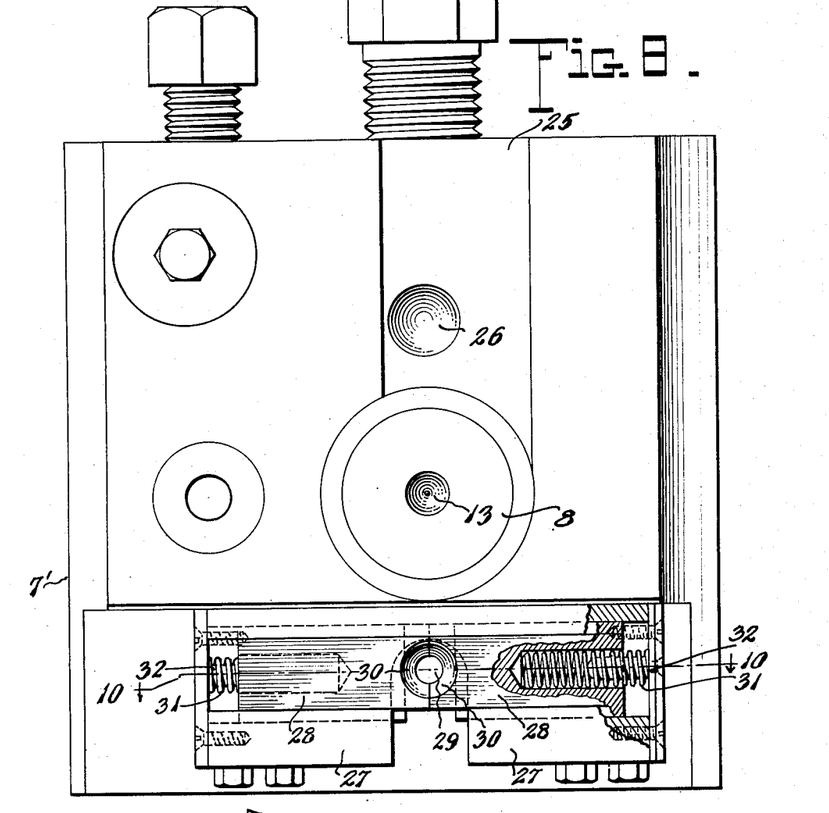
Figure 8 is a view in front elevation of the die block and stripper means, parts being broken away and seen in section for disclosing otherwise concealed parts, and the parts being shown on an enlarged scale.
Figure 9:
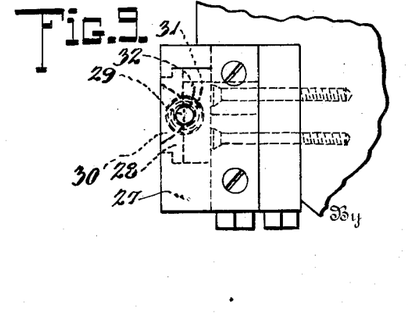
Figure 9 is a fragmentary, side elevation of the matrix die block showing the stripper in end view.

However, the said knock-out pin 23 and its operation are largely only precautionary, since the thimble 20, when completed about the finger 18, usually clings to the finger with a frictional engagement requiring the thimble to be stripped from the finger to prepare the finger for the next operation. To that end, the stripping mechanism seen in Figures 6 to 10 inclusive is provided. As best seen in Figures 7 and 8, the die engaging block 25 for die 8 is provided with a recess 26 to accommodate the projection 14 on the second stroke of the die block 2, the recess 26 being spaced above and in vertical alinement with the recess 13 and centered to correspond with the respective centering of the projection 14 and the finger 18. Ordinarily, in headers of the type shown, the space below the recess 13 corresponding to the location of the finger 18 when projection 14 is in a recess corresponding to recess 13 is merely an open space, but, according to the present invention, provision is made for engaging the thimble 20 on the finger 18 and stripping the same therefrom while beneath the die 8. Accordingly, a detent is provided for the thimble that allows the free movement of the finger. To this end, an appropriate framework 27 is arranged beneath the die 8 and provided with slide plates 28, 28, each having a semi-circular notch at its inner end facing the corresponding notch of the other slide plate so as to provide a passageway or opening 29 through which the finger 18 may freely move. That is to say, the passageway 29 is of a sufficient diameter to permit free movement of the finger alone through said passageway. The slide plates 28, however, are provided with inclined or conical walls 30, 30, leading to the aperture 29, the said walls being proportioned and located during operation to be struck by the rounded or globular end of the thimble 20 as the finger 18 approaches the recess 29. The slide plates 28 are preferably feathered or tongue-and-groove connected in the frame 27 to slide freely longitudinally therein, and a spring 31 stresses each of the slide plates toward the other to keep the ends of the slide plates in abutment when not forced apart. A guide pin 32 is preferably provided for each spring 31 and extends from frame 27 into and along the respective coiled spring 31 a distance sufficient to retain and guide the spring in its movements.

Thus, when the die block 2 makes its first stroke, the projection 14 compresses and shapes the material in the recess 13 and then the die block recedes, the material being left in the recess 13. The die plungers 5 and 6 are then shifted upward until finger 18 is brought into line with the recess 13, and then the die block 2 makes its second stroke during which the finger 18 enters the recess 13 and flows the material therein to the thimble-like shape to produce the thimble 20, as above stated. Then the die plungers 5 and 6 recede and descend to bring the projection 14 in line with recess 13 for the next first stroke. However, in making this next first stroke, the finger 18 carrying the thimble 20 causes the rounded end of the thimble to strike the beveled walls 30 and thus wedge the slide plates 28 apart against the stress of springs 31 until the abrupt end of thimble 20, that is the end having the opening of the recess within the thimble, passes the rear face of the plates 28 incident to the opening and closing movement of plates 28. Said slides thus become a direct detent for the thimble 20. With the next return movement of plunger 6, the edges of the thimble strike said detent and the thimble is thereby stripped from the finger 18 and allowed to drop into a chute for other receiver located below and not shown.

In Figures 11 to 20 inclusive is shown a second header which, in the general construction and operating mechanism, is identical with that just described, but to which have been added or substituted parts comprehending features of the present invention, so that the general mechanism will be referred to only briefly and the improved parts described in detail.

The header of Figures 11 to 20 inclusive is provided with the usual pitman 41 corresponding to pitman 1 of Figure 1, and is connected to impart the requisite thrusts to the die block 42. A plunger slide 43 is carried by die block 42 in position to slide vertically thereon, that is across the rectilinear, horizontal path of reciprocation of die block 42 while being carried by the die block and receiving the thrusts therefrom. A punch holder 44 is mounted on the plunger slide 43 and carries the punches or plunger dies 45 and 46 which are spaced vertically apart, the former above the latter. Appropriate apparatus, such as a crank 47 and its connected parts, impart timed vertical shifting movement to plunger slide 43 to cause the punch or die plunger 45 first to operate and then to move up out of the way, and then the punch or plunger die 46 to operate.

These parts are appropriately mounted on a suitable bed or framework 47' having an internal space accommodating the plunger dies 45 and 46 spaced from the cooperating opposing matrix die. This matrix die is seen at 48, and is of the type commonly known as "floating", since it is mounted in the die block 49 to reciprocate therein, being stressed outward, that is toward the plunger dies, by appropriate springs 50, 50, and held against movement outward beyond the face of die block 49 by overlapping shoulders at the outer end of the matrix die, such as shoulder 51 carried by the die block and shoulder 52 formed on the matrix die. Guiding pins 53 outstand from the backing plate 54 into sockets 55 formed in the die 48. The die 48 is provided with a longitudinal, axial bore 56 extending throughout its length and terminating at the exposed or front end portion of die 48 in a matrix 57 which is hexagonal in contour or otherwise shaped according to the intended exterior shape of the finished article to be forged within the matrix 57. A knock-out pin in the form of a sleeve is arranged in the bore 56 and has its forward portion reduced at 59 to correspond in cross section with and to snugly fit and ride within the matrix portion 57, the reduced portion 59 terminating in a shoulder 60 at the junction with the main portion of the knock-out pin or sleeve 58, and the said shoulder opposing a shoulder 61 in the length of the bore 56 for limiting the outward movement of the pin 58 in the bore 56, so that, while the reduced portion 59 can be caused to move to a position with its outer end slightly beyond the outer face of die 48, the pin 58 can not escape from the bore 56. Back of the pin 58 within the bore 56 is arranged a pin actuating sleeve 62 freely shiftable in the bore 56, the outer end of the sleeve resting against the inner end of the pin 58 and the inner end of the sleeve resting against actuating pins 63, 63 extending through and slidingly mounted in the retainer disc or backing plate 54. An appropriate set screw 64 is employed to lock the plate or disc 54 against movement. The rear ends of pins 63 rest against the forward end of a knock-out rod 65 which extends through the framework of the machine back to an actuating lever 66 pivoted at 67 and having its free end engaging a thrust rod 68 which imparts timed impulses to the knock-out rod 65.

The knock-out rod 65 at its forward end portion is provided with an axial bore 69 having an enlargement 70 in its length affording a shoulder 71, and a centering pin 72 is mounted in and reciprocates freely along the bore 69 and is provided with an enlargement affording a shoulder 73 opposing the shoulder 71. A spring 74 is coiled about the pin 72 between the shoulders 71 and 73 to stress the pin 72 outward, and a circumferential ridge 75 is formed on the pin 72 immediately in the rear of the backing plate or retaining disc 54 to limit the possible extent of outward movement of pin 72. Pin 72 extends through the backing plate 54, through the collar or sleeve 62, and through and beyond the knock-out pin 58, and the exposed or front end portion of the pin 72 is proportioned to correspond with the internal dimensions of the finished capped nut blank, and, to that end, is provided with a parti-globular terminus 76.

Figure 16:
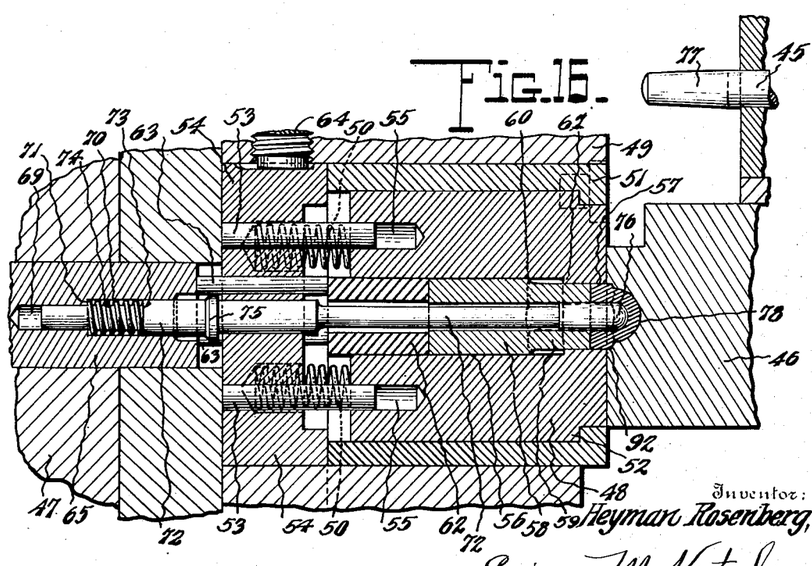
Figure 16 is a similar view of the same at or just after the conclusion of the second stroke of the header.
Figure 17:
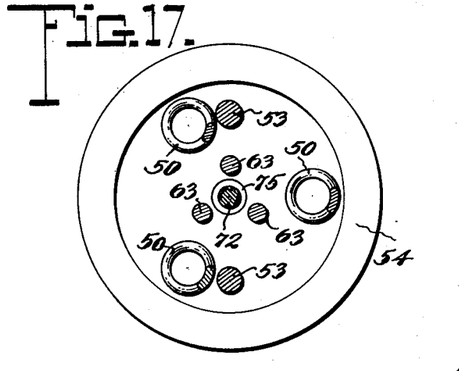
Figure 17 is a detailed elevation of the retainer disc detached, parts being seen in section, and the section being taken on the plane indicated by line 17—17 of Figure 15 and looking in the direction of the arrows.

Cooperating with the floating die 48, the plunger die 45 is provided with a push-on tool or finger 77, and the finishing plunger die 46 is provided with a matrix or recess 78 complemental of the matrix 57, so that, when the two are brought together as seen in Figure 16, they have an internal surface contour corresponding with the external surface contour of the dome or cap and the sides of the finished capped nut blank.

Figure 14:
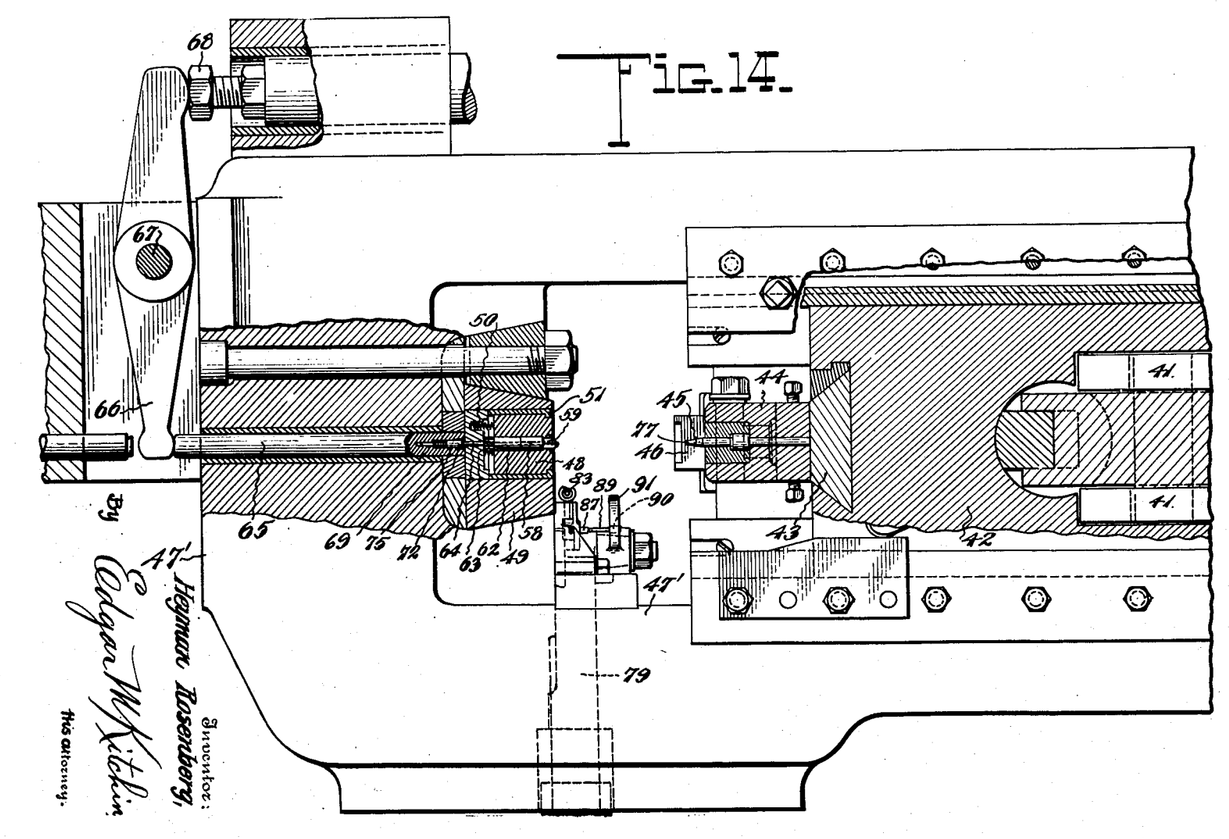
Figure 14 is a view similar to Figure 5 of the header seen in Figure 11.
Figure 18:
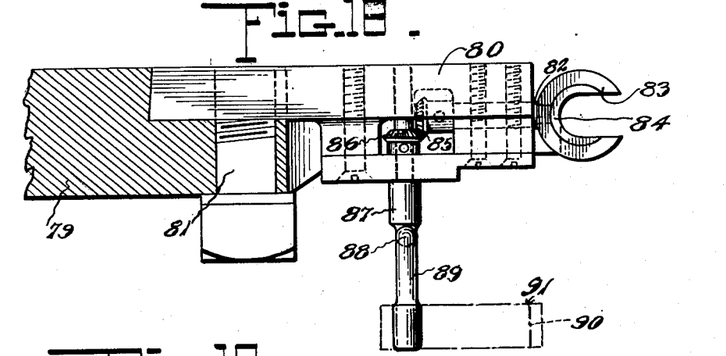
Figure 18 is a view partly in plan and partly in horizontal section of the blank feeding carriage and mechanism for shifting the blank to the proper angularity to effect registration thereof with the supporting and knock-out pins.
Figure 19:
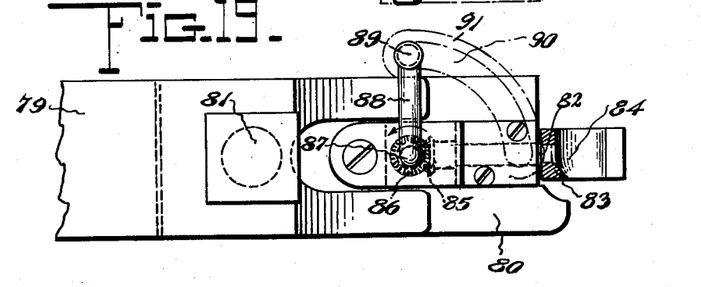
Figure 19 is a view in side elevation thereof, parts being seen in section.
Figure 20:
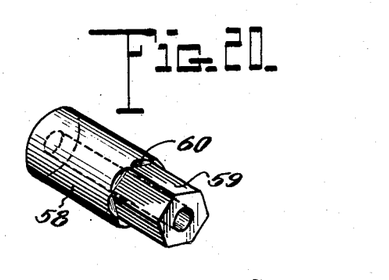
Figure 20 is a perspective view of the knockout pin detached.

Cooperating with the dies 45 and 46 is a feeding mechanism for delivering the thimble-like shells or thimbles of Figures 4 and 12, or like thimbles however previously produced, to alinement with the matrix 57, and such feeding mechanism is seen in assembled relation in top plan in Figure 14 and in detail in Figures 18 and 19, and includes the transversely reciprocating slide bar or carriage 79, which is the same part in the general header mechanism as the part 12 of Figure 5 which carries the cutter. However, no cutter being required, the slide 79 is employed as the carriage for the feeding mechanism for the thimble-like shells, and, to that end, a frame 80 is detachably fixed to the slide bar 79, as by a bolt 81, and the abutting shoulders of the contacting parts. Journaled in the inner end portion of frame 80 is a shaft 82, the exposed or inner free end of which carries a fork or yoke 83 which, as seen in Figure 19, has its fork space or internal recess 84 shaped to correspond with and snugly receive the thimbles or thimble-like shells 20 when dropped into the fork from above with the parti-globular closed end of the thimble downward. Mechanism, not illustrated, is preferably employed, such as a feeding hopper and tube, for delivering thimbles to the fork 83, but obviously thimbles can be delivered thereto by hand. To the outer end portion of the shaft 82 is fixed a beveled gear 85 meshing with a similar gear 86 carried by an actuating shaft 87. A crank arm 88 upstands from shaft 87 and is provided with a laterally extending wrist pin 89, the free end of which pin extends into an arcuate slot 90 which extends for ninety degrees of an arc so that in moving along the slot 90 the wrist pin 89 moves the crank arm 88 from the vertical position of Figures 18 and 19 to a horizontal position. The slot 90 is arranged in a bracket 91 fixed to and immovably extending inwardly from a portion of the frame 47'. Thus, when the slide 79 is in its outermost position, the wrist pin 89 is at the upper end of the slot 90, as seen in Figures 18 and 19, and the fork 84 is open upward to receive a thimble-like shell 20; but, as the slide 79 begins to move inward or toward and across the path of the plunger dies, the pin 89 is caused to travel or shift along the slot 90 until it reaches the lower end of the slot, during which movement the shaft 87 is caused by such shift to be rotated through an angle of ninety degrees. Such rotation is in the direction indicated by the arrow in Figure 19, so that the shaft 82 is rotated by gears 86 and 85 to cause the fork 83 to move from the upright position to a sidewise position, whereby the thimble carried by the fork is brought to a position in line with the matrix 57 with the open end of the thimble or shell presented toward the matrix and with the bore or recess of the shell in line with the centering pin 72. All the parts are, of course, timed in their movements relative to each other, as is common practice in header mechanism, so that, when the thimble-like shell is thus brought into line with pin 72 the push-on tool or finger 77 has approached and strikes the thimble within the fork 83 and pushes it on to the pin 72 until it is seated against the parti-globular end 76 thereof. The parts are then in the position shown in Figure 15, except that the fork 83 is not therein shown. Immediately the fork 83 begins to recede and the push-on finger 77 also begins to recede, and when the latter has reached the limit of its rear stroke it is moved upward until the matrix 78 of finishing die 46 is brought into line with the thimble on the pin 72. Then the finishing die 46 advances until it engages the blank or thimble, and then continues its advancing movement until it reaches the position seen in Figure 16. The finishing die 46 in reaching this position compresses the thimble-like shell longitudinally while expanding certain portions of its walls laterally until the finished blank 92 is produced as seen in Figure 13 detached and seen in the machine in Figure 16.

As soon as this is accomplished, the finishing die 46 begins to recede and the knock-out rod 65 advances and causes the knock-out pin 58 to push the finished blank out of matrix 57, and then the rod 65 recedes and leaves the parts ready for the next thimble to be applied to the projecting end of centering pin 72. It will be observed that the advance of the push-on finger 77 against the blank in pressing the same onto the pin 72 pushes the knock-out pin 58 with collar 62 and pins 63 back to the position seen in Figures 15 and 16.

Figure 15:
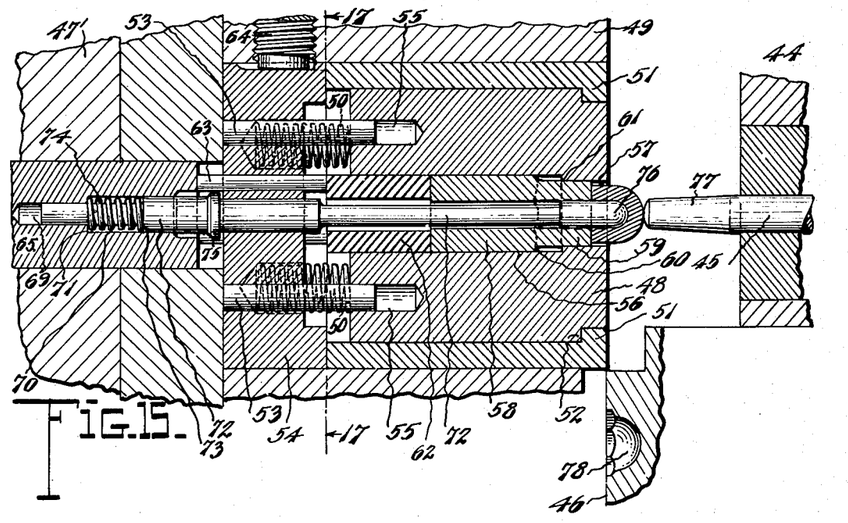
Figure 15 is an enlarged, fragmentary, vertical section through dies and cooperating parts of the header seen in Figures 11 and 14, the parts being seen in the position at the conclusion of the first advance stroke of the header and just prior to the receding stroke.

It should also be noted that the die block 49 is formed with an appropriate recess 93 which accommodates the finger 77 when in its raised position and while the finishing die 46 is shaping the blank within the matrix 57 and matrix 78. Finishing die 46, on the other hand, is accommodated beneath the die 48 when the finger 77 is pushing the blank onto the centering pin 72. The floating capacity of the die 48 enables cooperative adjustment and compensating movements which are always very slight to enable the accomplishment of the results seen in Figure 13, and it will be understood by those familiar with standard headers that the knock-out rod 65 in its receded position, as seen in Figures 15 and 16, is firmly held against further backing off so that the pins 63, collar or sleeve 62, and knock-out pin 56 can not back off, and the knock-out pin therefore provides an abutment against which the free edges of the blank being made are shaped.

It will be noted from the foregoing that the thimble-like shell or blank 20 of Figures 4 and 12 is substantially circular in cross section throughout the greater part of its length and that the action of the matrices 57 and 78 effects expansion to a polysided contour of the nut body and the perfectly finished dome or parti-globular cap.

Figures 10, 21, 22, 23:
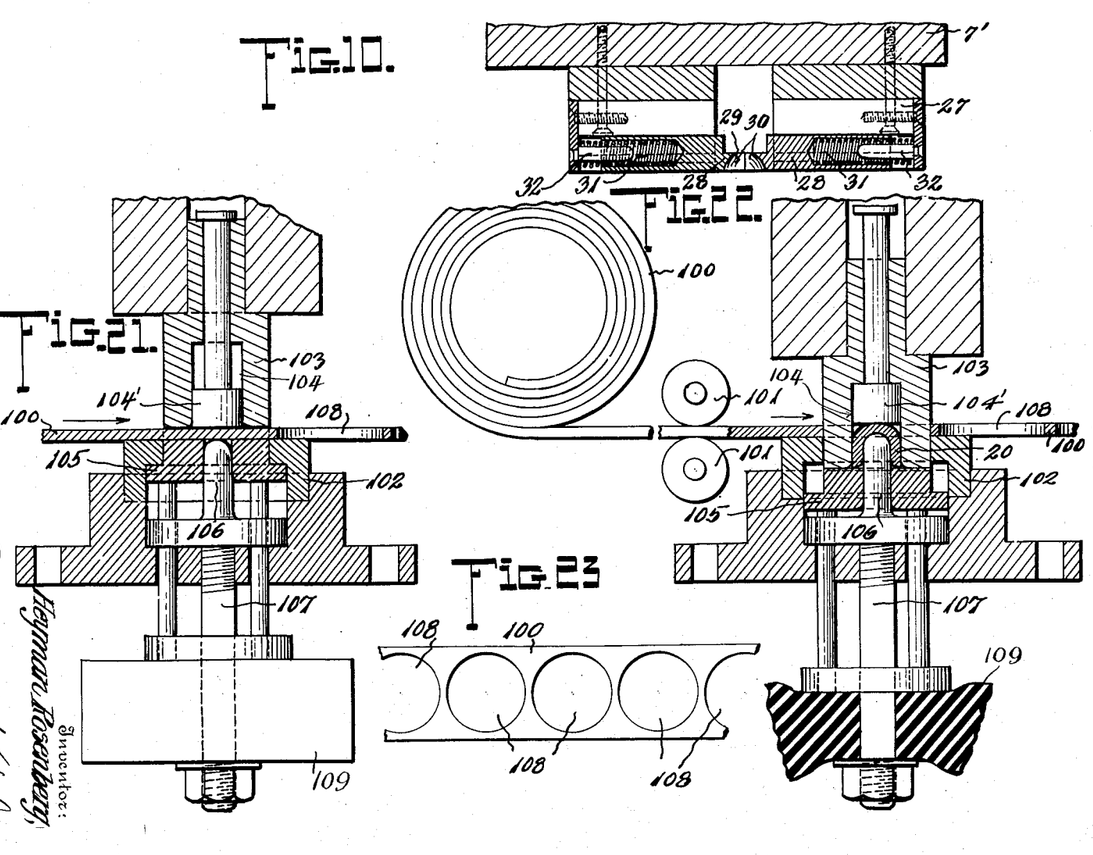
Figure 10 is a horizontal section taken on the plane indicated by line 10—10 of Figure 8.
Figure 21 is a longitudinal, vertical sectional elevation of a combination cutting and forming die and cooperating parts for producing thimble-like shells from sheet material, some of the parts being indicated diagrammatically.
Figure 22 is a similar view of the same at the conclusion of a cutting and forming stroke.
Figure 23 is a fragmentary section of metal strip or like material from which the cap-forming discs have been stamped by the operation of the structure seen in Figures 21 and 22.

It should be readily understood also that the first steps and the material employed by which the thimble-like shell 20 is produced are susceptible of variations without departing from the principles and scope of the present invention, and, as illustrative of other steps by which said blank 20 can well be produced, the structures seen in Figures 21 and 22 may be referred to. In these figures is shown stamping mechanism for producing thimble-like shells not from wire or bulk material but from sheet material, such as appropriate sheet metal.

Referring to these figures specifically by numerals, 100 indicates a roll of material, such as a strip of sheet metal, which provides the stock or supply, and the strip is laced through feeding rollers 101 that sufficiently frictionally engage the strip 100 to feed the same forward incident to rotation of the rolls, and the rolls are rotated by mechanism timed to operate in co-ordination with the operation of the other parts. A shearing die 102 is arranged just below the path of the strip 100, and immediately above the path of said strip is arranged a plunger shearing die 103 having a shaping, axial recess or bore 104 in which is located a knock-out pin 104'. A floating die 105 is arranged within and surrounded by the shearing die 102 and mounted to recede with the advance of the plunger die 103, so that, when the die 103 is moved down into the die 102, a disc is cut from the strip 100 and forced down into the space surrounded by die 102. An upstanding finger 106 is stationarily mounted within the floating die 105 so that the die 105 can slide down along the finger 106. An appropriate adjusting screw 107 is preferably provided for setting the finger 106 at the required location and for sustaining the same against movement incident to the pressure to which the finger is subjected. The finger 106 is proportioned to correspond with the finger 18 of Figure 1 in contour and dimensions, and as the plunger die 103 descends and severs a disc from the strip 100, the said disc is caused to be drawn over the end and shaped about the finger 106 as the die 103 descends, the recess 104 corresponding substantially to the matrix 13 of Figures 6 and 7. The plunger die 103 continues to descend and thus to shape the material of the severed disc about the finger 106 and within the matrix or recess 104 until a completed thimble 20, as seen in Figure 22, is produced, this thimble being the same substantially in every particular with the thimble 20 of Figure 4 except for the fact that it is made of sheet material drawn to the required shape and proportions instead of being forged from a slug.

As soon as the thimble 20 is completed by the action of the die 103 over the finger 106, the die recedes or moves upward to the position seen in Figure 21, and as it recedes the floating die 105 follows and thus strips the thimble 20 from the finger 106. As the die 103 continues upward the knockout pin is arrested by an abutment (not shown) and the further upward movement of the die 103 carries the die clear of the formed blank, causing the blank to be stripped out of the die 103. The machine is desirably mounted in an inclined position to cause the stripped blank to fall by gravity away from the path of the die 103 and into a suitable receptacle (not shown). When the formed blank has been thus discharged from between the dies 103 and 105, the feeding rolls 101 operate to advance the strip 100 a distance sufficient to present fresh material for the action of the parts 103, 102, 105, and 106.

In Figure 23 is illustrated the results of the action of these parts on the strip 100 which is to leave a series of circular openings 108 therein, the said openings being, in ideal operations, as closely spaced as practicable for effective shearing action of the next succeeding blank without leaving any defective edge to the blank. When the thimble-like shell 20 is thus produced it is fed to the fork 83 and treated in the manner above set forth.

The floating die 105 is preferably resiliently retained in operative position by known apparatus including a cushion 109, such as a block of rubber or other appropriate resilient material.

What is claimed is:—

1. In the art of forming capped nut blanks, the steps of shaping a flat sheet blank into an elongated thimble-like shell, and subsequently shaping the shell to that of a nut body and an integral dome-like cap, the said subsequent shaping of the shell including longitudinal shortening and simultaneous lateral spreading and thickening of a skirt portion of the shell wall while supporting the dome portion against deformation.

2. In the art of forming capped nut blanks, the steps of shaping metal into an elongated thimble-like shell, and subsequently shaping the shell to that of a nut body and an integral dome-like cap, the said subsequent shaping of the shell including longitudinal shortening and simultaneous lateral spreading and thickening of parts of the shell wall while supporting the dome portion against deformation.

3. In the art of forming capped nut blanks, the steps of shaping a mass of metal, such as a slug, into an elongated thimble-like shell, and subsequently shaping the shell to that of a nut body and an integral dome-like cap, the said subsequent shaping of the shell including longitudinal shortening and simultaneous lateral spreading and thickening of parts of the shell wall while supporting the dome portion against deformation.

4. In the art of forming capped nut blanks, the steps of cold forging a mass of metal into an elongated thimble-like shell, and subsequently cold forging the shell to the shape of a nut body and an integral dome-like cap, the said subsequent forging of the shell including longitudinal shortening and simultaneous lateral spreading and thickening of parts of the shell wall while supporting the dome portion against deformation.

5. The method of forming a capped nut which comprises forming a blank having a dome and a hollow body of substantially the same diameter as the dome base and having less cross-sectional wall area than that desired in the finished body, and then spreading and broadening a skirt portion of the body wall to substantially polygonal external contour, by simultaneously laterally expanding and longitudinally compressing the skirt portion of the body while solidly supporting the blank externally of the dome and internally of the body.

6. The method as claimed in claim 5 wherein the steps referred to are accomplished in successive internal dies in cooperation with coordinating external dies.

7. The method as claimed in claim 5 wherein the initial forming of the blank is accomplished by punching it from a sheet of material and driving it onto an inner forming die at a single stroke.

8. The method as claimed in claim 5 wherein the skirt is formed in a surrounding unitary die of appropriate contour to limit expansion of the skirt to the desired shape and size.

9. The method as claimed in claim 5 wherein the blank is formed from a slug of metal by first driving the slug into a female die to impart the desired external dome shape to the blank and then driving an inner die into the blank contained in the female die to hollow out the interior of the blank.

10. The method as claimed in claim 5 wherein successive blank slugs of measured length are severed from a metallic rod or wire, then die-forged to a dome shaped cylindrical external contour, and then die-forged internally to provide an internal bore.

11. The method of forming a capped nut which comprises forming a thimble-like blank having a hollow, substantially cylindrical body and a dome-shaped end, solidly supporting the body upon an internal die with the open end of the blank body disposed within a surrounding die larger than the exterior of the blank body, relatively moving the blank so supported and a complementary die having a dome shaped recess to drive the dome portion of the blank into the dome shaped recess of the complementary die to simultaneously compress the wall portion of the body longitudinally and spread and broaden it laterally to the external contour of the surrounding die.

HEYMAN ROSENBERG.